(12) United States Patent
Askeland et al.

(10) Patent No.: US 12,024,192 B2
(45) Date of Patent: Jul. 2, 2024

(54) VERIFYING REPRODUCIBILITY FOR A VEHICLE CONTROLLER

(71) Applicant: Zoox, Inc., Foster City, CA (US)

(72) Inventors: Jacob Lee Askeland, San Jose, CA (US); Rasoul Kabirzadeh, Redwood City, CA (US); Yangwei Liu, Newark, CA (US); Shao-Han Tang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 71 days.

(21) Appl. No.: 17/450,750

(22) Filed: Oct. 13, 2021

(65) Prior Publication Data

US 2023/0112050 A1    Apr. 13, 2023

(51) Int. Cl.
*B60W 60/00* (2020.01)
*B60W 50/00* (2006.01)
*G06F 7/58* (2006.01)
*G07C 5/08* (2006.01)

(52) U.S. Cl.
CPC ...... *B60W 60/001* (2020.02); *B60W 50/0098* (2013.01); *G06F 7/588* (2013.01); *G07C 5/085* (2013.01); *B60W 2050/0083* (2013.01)

(58) Field of Classification Search
CPC .... G07C 5/085; G06F 7/588; B60W 50/0098; B60W 60/001; B60W 2050/0083
See application file for complete search history.

(56) References Cited

U.S. PATENT DOCUMENTS

| | | | | |
|---|---|---|---|---|
| 8,423,333 | B2 * | 4/2013 | Maegawa | G06N 3/006 |
| | | | | 703/6 |
| 9,507,346 | B1 * | 11/2016 | Levinson | G05D 1/0291 |
| 2014/0025365 | A1 | 1/2014 | Kajitani et al. | |
| 2021/0387628 | A1 * | 12/2021 | Wang | B60W 30/18163 |
| 2022/0204009 | A1 * | 6/2022 | Choi | G06F 30/15 |

FOREIGN PATENT DOCUMENTS

| | | |
|---|---|---|
| JP | 2017211381 A | 11/2017 |
| KR | 20120060473 A | 6/2012 |
| WO | WO2020106902 A2 | 5/2020 |

OTHER PUBLICATIONS

Riedmaier et al. "Model Validation and Scenario Selection for Virtual-Based Homologation of Automated Vehicles." Applied Sciences. Jan. 1, 2021, vol. 11. No. 35.
The PCT Search Report and Written Opinion dated Jan. 18, 2023 for PCT application No. PCT/US2022/077575, 10 pages.

* cited by examiner

*Primary Examiner* — Dale Moyer
(74) *Attorney, Agent, or Firm* — Lee & Hayes, P.C.

(57) ABSTRACT

Techniques associated with detecting non-deterministic behavior with a component and/or subcomponents of an autonomous vehicle are discussed herein. In some cases, a simulation system may be configured to simulate operations of the autonomous vehicle and to detect changes in behavior between instances and with respect to log data or expected results. The simulation system may flag or otherwise identify components and/or subcomponents responsive to detecting potentially non-deterministic behavior.

20 Claims, 5 Drawing Sheets

VERIFYING REPRODUCIBILITY FOR A VEHICLE CONTROLLER

BACKGROUND

Autonomous vehicles may define and navigate along preplanned routes without the assistance of a human driver. Various systems have been developed to assist with testing, updating, and maintaining operational software and hardware of the autonomous vehicles to ensure safety and reliability prior to deployment of the vehicles. However, more and more often the vehicles software may include non-deterministic outputs that may unexpectedly change and/or vary during simulation. Accordingly, the simulation and test software may have difficulty in reproducing and verifying simulation and test results prior to deployment of the software on vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
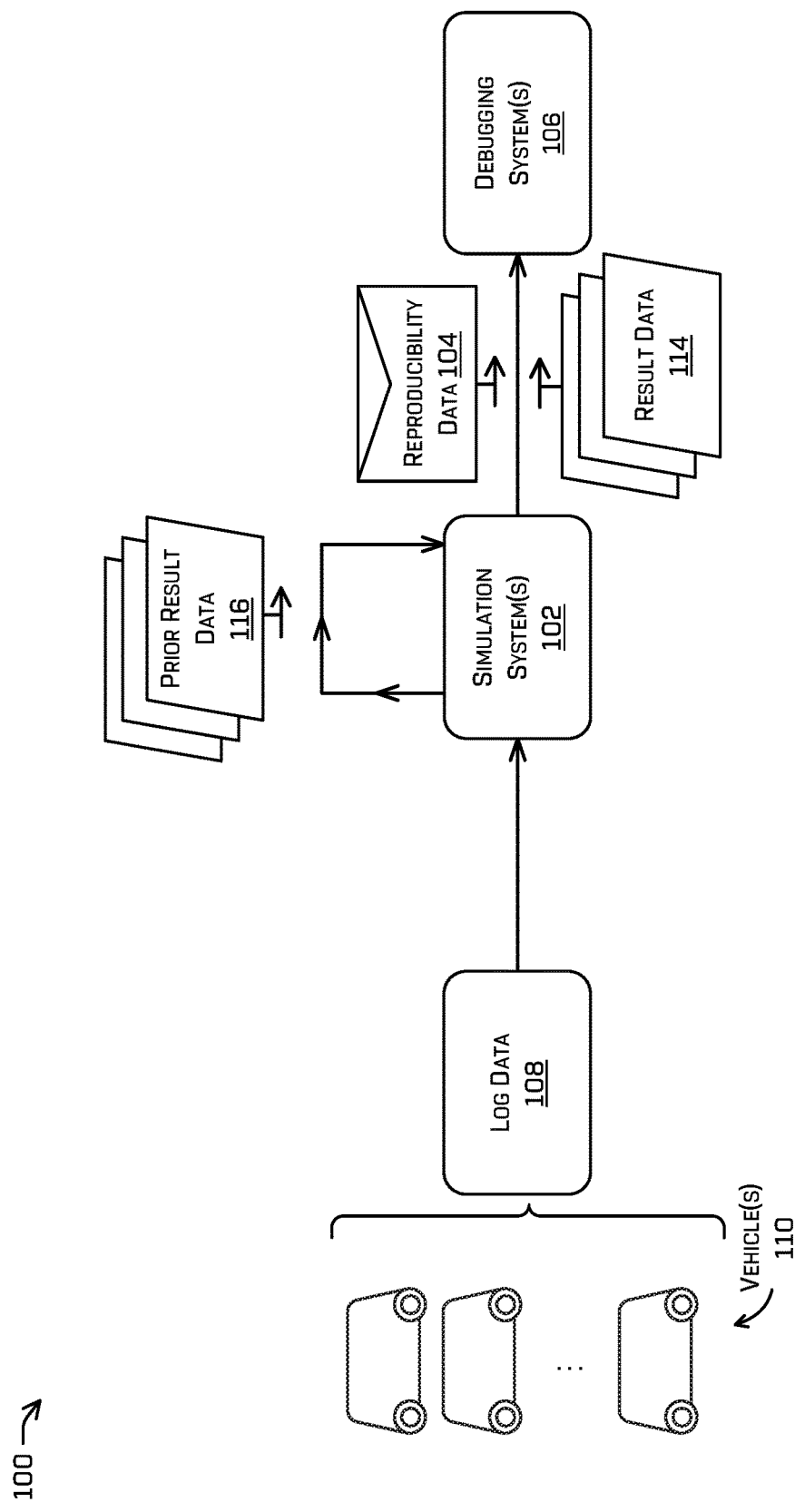
FIG. 1 is an example block-diagram illustrating an example architecture associated with simulation and testing software to improve reproducibility, in accordance with examples of the disclosure.

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. In some cases, a planning system may generate or plan the reference trajectory or route and/or update the route as the vehicle navigates through physical environment. In some cases, while navigating, the autonomous vehicle may encounter dynamic objects (e.g., vehicles, pedestrians, animals, and the like), static objects (e.g., buildings, signage, parked vehicles, and the like) in the physical environment. In order to ensure the safety of the occupants and objects, the planning system may make operational decisions and/or otherwise modify the trajectory or route based on a predicted behavior or location of individual objects. In various instances, any amount of data may be recorded from the first sensor data received, to intermediate processed data, to final command signals generated based at least in part on the intermediate processed data, and anything else in between. Such recorded data may be referred to herein as log data.

In some cases, scenarios may be generated from log data captured by operating vehicles. For example, the scenario may be generated using map data and static objects identified within the log data. Dynamic objects may then be inserted, placed, and/or arranged with respect to the static objects to test the vehicle under various conditions and parameters. In some examples, the vehicle components may rely on non-deterministic operations, such as one or more outputs of a machine learned model and/or network, in association with generating and/or updating a trajectory or route. To ensure safety of the autonomous vehicle and/or any passengers, changes to the vehicle components and software are tested via simulation prior to implementing on vehicle. However, obtaining reproducible results during simulation and/or at run time for the non-deterministic operations of the planning system is often difficult. Accordingly, the planning systems and/or simulation systems, discussed herein, are configured to improve the reproducibility of the outputs of the simulations.

In some cases, the vehicle component may save keyframes at predetermined intervals of time to assist the simulation and debugging any non-deterministic operations and generating reproduceable results. However, often internal state and/or the output of the vehicle components (e.g., the planning component, perception component, prediction component, subcomponents thereof, and the like) are so large and complex that it is not feasible to track and store the entire internal state of each component via keyframes, particularly when the keyframing is performed in real time. In some examples, to reduce the load on the vehicle components, the simulation systems may be configured to detect the non-deterministic operations during simulation. For example, the simulation system may track and/or record a change or difference between multiple simulation instances at various intervals. In this manner, the simulation system may allow for debugging between multiple simulation instances or outputs by running the record in reverse from the position of the potential issue while monitoring the differences between individual instances. In some examples, by ensuring reproducible results given identical input data improves the safety of the autonomous vehicle when in operation as the vehicle is able to operate with a higher or increased confidence that the planner system or other components of the vehicle are generated expected and dependable results.

Although examples are described in the context of autonomous vehicles, the techniques described herein are not limited to use with autonomous vehicles and may be used to generate and identify simulations for use with other scenarios, such as other types of vehicles (e.g., autonomous, semi-autonomous, or manually driven land vehicles, watercraft, aircraft, spacecraft, etc.), automated manufacturing, video games, etc.

FIG. 1 is an example block-diagram illustrating an example architecture 100 associated with simulation and testing software to improve reproducibility, in accordance with examples of the disclosure. As discussed above, multiple scenarios with varying conditions and parameters as executed by various vehicle components with respect to the same or similar trajectories may be simulated for testing purposes and the vehicle components may include non-deterministic operations. Accordingly, in this example, a simulation system 102 may be configured to detect non-deterministic operations and generate reproducibility data 104 usable by a debugging system 106 and/or a software engineer to detect and debug the various vehicle components.

As used herein, the term reproducibility may refer to ensuring that the behavior of a component is consistent, such that the same input to a component (e.g., a function of an application) results in the same output. In some contexts, reproducibility can refer to consistent operation of a component of an autonomous vehicle, such as a planner system.

In the current example, log data 108 may be received from one or more vehicles 110 operating on various roadways in real world conditions and environments. As discussed herein the log data 108 may include sensor data, perception data, prediction data, trajectory information, and the like. The log data 108 may be processed by the simulation system 102. For example, the simulation system 102 may include a scenario generation component to generate one or more simulation scenarios including defined regions, actors or objects, parameters of the actors or objects (e.g., speed, trajectory, initial position, etc.), and the like usable to test and/or simulate output result data 114 of the vehicle components and/or subcomponents. The simulation system 102 may then simulate the execution of the vehicle components (e.g., the components and/or subcomponents being tested) based at least in part on the generated simulation scenarios. As an example, details associated with simulation scenario generation may be discussed in U.S. application Ser. No. 16/866,715 entitled "System for Generating Generalized Simulation Scenarios", Ser. No. 16/586,838 entitled "Safety Analysis Framework", and Ser. No. 16/586,853 entitled "Error Modeling Framework", which are herein incorporated by reference in their entirety for all purposes.

In some cases, the vehicle components and/or subcomponents may include a non-deterministic component or module that generates a non-deterministic results or output. In these cases, the result data 114 output by the simulation system 102 may vary from instance to instance even given the same input data (e.g., the same simulation scenario with the same regions, actors and objects, and parameters). In some instances, by comparing the result data associated with multiple simulations and/or by comparing the prior result data 116 to the log data 108, individual components and/or subcomponents may be marked or otherwise identified as non-deterministic in nature and, thereby, either flagged as non-deterministic or updated to remove the non-deterministic features.

In the current example, the result data 114 may be stored in a computer-readable media for further human review and/or provided to a triage component for further categorization prior to human review. For example, details associated with result data 114 and categorizing of result data may be discussed in U.S. application Ser. No. 17/302,342 entitled "System for Identifying Simulation Scenarios", which is herein incorporated by reference in its entirety for all purposes.

In some examples, the simulation system 102 may be configured to detect non-deterministic results, systems, components, and the like to assist with debugging the vehicle components and/or removal of inadvertent non-deterministic components and modules. In this example, the simulation system 102 may, for individual simulation instances, store the result data 114 as prior results data 116. In this manner, the simulation system 102 may compare the current result data 114 to the prior result data 116 (such as when the same simulation scenario with the same characteristics are re-tested or re-simulated) to determine if the results are reproducible. In this example, the simulation system 102 may compare the results data 114 and 116 over a plurality of predefined intervals (e.g., period of time) and determine that the results data 114 is reproducible when all intervals generate reproducible or matching results.

In some cases, when non-matching results are detected at one or more intervals between the prior result data 116 and the current result data 114, the simulation system 102 may generate the reproducibility data 104. The reproducibility data 104 may indicate the interval at which a discrepancy or variation is detected between the prior result data 116 and the current result data 114. In some examples, the simulation system 102 may be configured to reduce the overall data storage requirements associated with detecting and debugging non-deterministic operations by storing a predetermined number of keyframes associated with prior intervals. The simulation system 102 may then, upon a detecting of an interval with nonmatching results with respect to the prior results data 116 (and/or outside of a threshold), incorporate the prior intervals keyframe data into the reproducibility data 104. In this manner, only the log data of the simulation instance associated with the non-deterministic interval and intervals in proximity thereto are stored for access by the debugging system 106 and/or the software engineering during debugging, thereby reducing the overall data storage requirements of the simulation system 102.

The reproducibility data 104 may be provided to the debugging system 106, such that the debugging system 106 and/or a debugging engineer may work backwards through the simulation instance in order to detect and/or correct the non-deterministic operations. In this manner, the simulation system 102 may utilize the prior result data 116 and the current result data 114 to determine reproducibility of the vehicles components and/or subcomponents being tested. Details associated with reproducibility data 104 may be discussed in U.S. Pat. No. 10,678,740 entitled "Coordinated Component Interface Control Framework", which is herein incorporated by reference in its entirety for all purposes.

In the current example, the architecture 100 is described with respect to a simulation system 102. However, it should be understood that the architecture 100 may be implemented on vehicle, such as within a planning system. In these examples, the planning system may detect the non-deterministic operation and store the keyframes that may be used to debug the planning system at a later time without requiring the autonomous vehicle to store the entire state of the planning system as the vehicle traverses along the entirety of the reference trajectory.

Figure 2:
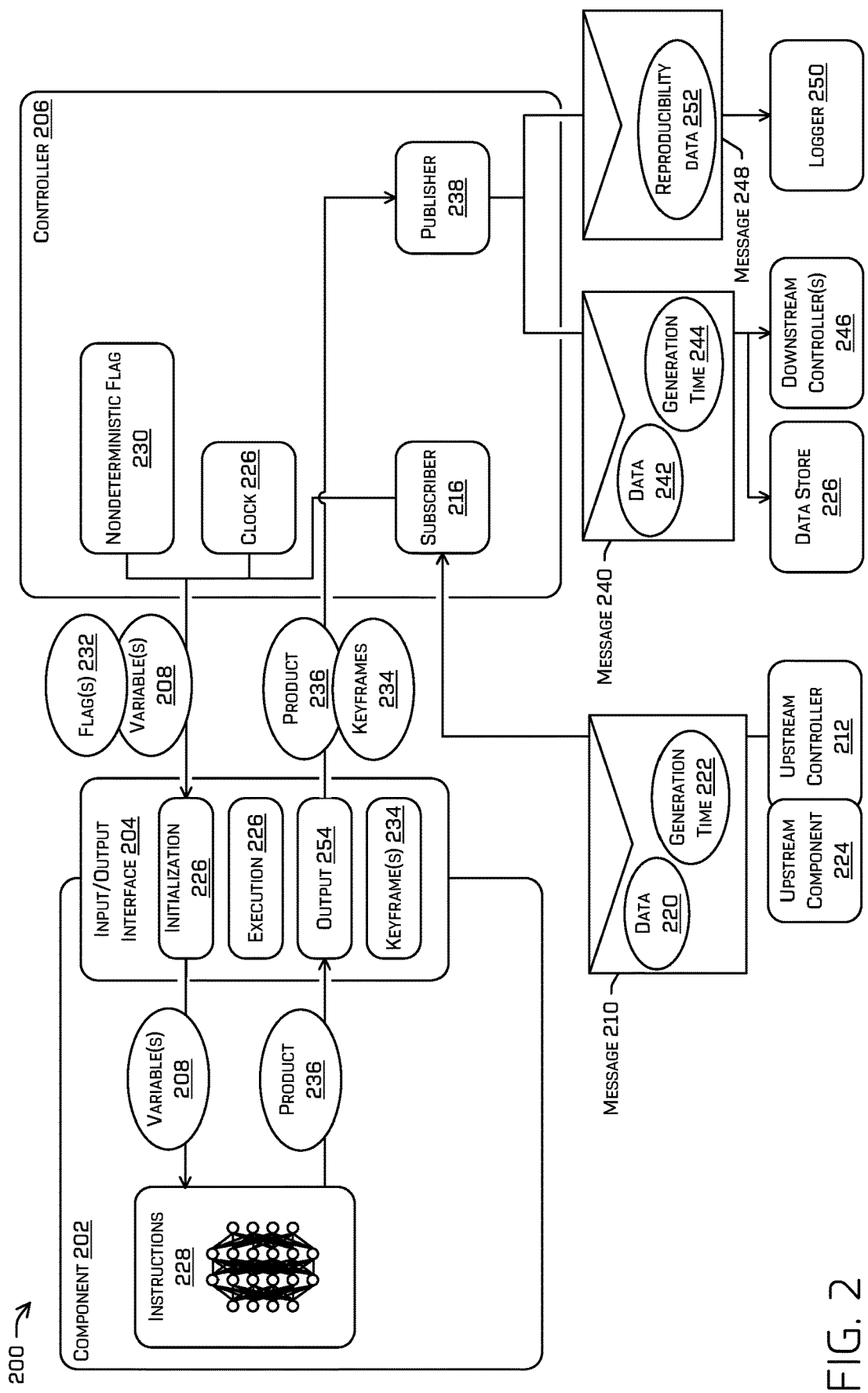
FIG. 2 is another example block-diagram illustrating an example architecture associated with a component, input/output interface, and a controller, in accordance with examples of the disclosure.

FIG. 2 is another example block-diagram illustrating an example architecture 200 associated with a component 202, input/output interface 204, and a controller 206, in accordance with examples of the disclosure. In some cases, the autonomous vehicle may comprise a data processing pipeline, a computer vision system, a perception component, and the like. Accordingly, the autonomous vehicle may comprise one or more components. A component may, itself, comprise a system of multiple elements (e.g., various combinations of hardware and/or software). To illustrate, the autonomous vehicle may comprise one or more machine learned models and/or networks that comprises multiple systems such as, for example, a perception system, a localization system, a planner system, a drive module control system, an internal operations system, and the like. The individual systems may also comprise tens, hundreds, or even thousands of components. For example, a perception system may include one or more sensor data processing components, a component for segmenting an image, a component for segmenting points of lidar data, a component for classifying an object identified in sensor data, a component for tracking an object, etc. Moreover, one of these components may include a plurality of sub-components such as neural network(s) and/or other machine-learned models, instructions executable by a processor, and/or hardware.

The architecture 200 may configure induvial systems so that operations performed and/or actions taken by component(s) (such as component 202) of the system may be reproduced deterministically for every same input that is provided to the system implementing the architecture 200, a same output is generated by the system. In some instances, the architecture 200 also facilitates the ability to replace the component 202 of a system with another component. In at least some examples, the architecture 200 may enable preserving certain system variables (e.g., internal states, execution times, etc.), as, for instance, keyframes. In such examples, the architecture 200 may be able to categorize how a component impacts overall system accuracy and/or precision, regardless of system resources required.

In some instances, the architecture 200 may comprise a controller 206 that provides signals to an I/O interface 204 between the component 202 and the controller 206. In some examples, the controller 206 may be the destination and source of all input/output functions of the component 202 and/or the controller 206 may cause the component 202 to execute. In other examples, at least one input and/or output of a component 202 may be input or output outside of the component 202. Additionally or alternatively to controlling input and/or output to the component 202, the controller 206 may control an execution state of the component 202. To control input provided to, output from, and/or execution of the component 202, the controller 206 may provide signals, such as variables 208, and/or other data to the input/output interface 204 and/or may control a status of the input/output interface 204.

In the current example, the controller 206 may be operating during real-time execution of the autonomous vehicle systems. For example, controller 206 may be used on the autonomous vehicle to provide messages from upstream controller(s) 212 to the component 202, from the component 202 to downstream controller(s) 246, thereby abstracting the input/output functionalities of the component 202, and/or to control when the component 202 executes. In some examples, the controller 206 may receive a message 210 from an upstream controller 212 at a subscriber 216 of the controller 206.

The subscriber 216 may receive the message 210 and determine that message 210 comprises data 220 and/or generation time 222. The generation time 222 may comprise an identifier of a time at which a product (e.g., associated with data 220) was received at the upstream controller 212 from the upstream component 224 associated therewith, a time at which the upstream controller 212 generated the message 210. In some instances, data 220 may comprise a product of an execution of upstream component 224 associated with upstream controller 212.

Subscriber 216 may provide data 220, or at least a portion thereof, to the initialization input interface 226 as one of one or more variable(s) 208 provided from the controller 206 to the initialization input interface 226, as illustrated. Variable(s) 208 may include values usable by instructions 228 to execute. In some cases, the controller 206 may also comprise a non-deterministic flag 230 which may be applied to variables 208 that are generated from a known non-deterministic controller, such as controller 206 in the current example. The non-deterministic flag 230 may indicate that an output associated with the data 220 (e.g., the variables 208) are non-deterministic as described herein. In cases in which the flag 232 is set, the component 202 may generate and store keyframes 234 associated with the product 236 of the instructions 228, such that the keyframes 234 are usable to debug and detect the non-deterministic operations associated with the product 236, for instance, at a later date and/or time. For example, the keyframes 234 may be utilized to reconstruct the state of the component 202 during testing or other debugging, as the product 236 is known to be non-deterministic in nature.

In the illustrated example, the output interface 254 may receive a product 236 of execution of the component 202 and provide the product 236 to a publisher 238 of the controller 206. Based at least in part on receiving the product 236, the publisher 238 may generate a message 240 comprising data 242 and/or a generation time 244, which may be received by downstream controller(s) 246. In some instances, the publisher 238 may also publish a reproducibility message 248. In some instances, the reproducibility message 248 may be received by a logger 250 that receives reproducibility message(s) from one or more components over a logging channel that may be different than a channel for data messages.

A reproduction controller may use the reproducibility message(s) 248 stored by the logger 250 to deterministically reproduce behavior of the component 202. In some instances, the controller 206 may operate as a pure transport layer and may not generate reproducibility message(s).

In some instances, the reproducibility message 248 may comprise reproducibility data 252. In some instances, the reproducibility data 252 may comprise information sufficient to reproduce a particular operation of the component 202, such as the keyframes 234 (e.g., information sufficient to re-run a specific execution of the instructions 228, such as the last execution that resulted in outputting product 236. In some cases, the reproducibility data 252 may include states of the random number generators associated with the component 220, clock times, and timestamps requested from the clocks by the component 220, identifiers of the components 220, and the like. In some cases, the keyframes 234 may also be included in the reproducibly data 252 together with the flags 232.

Figure 3:
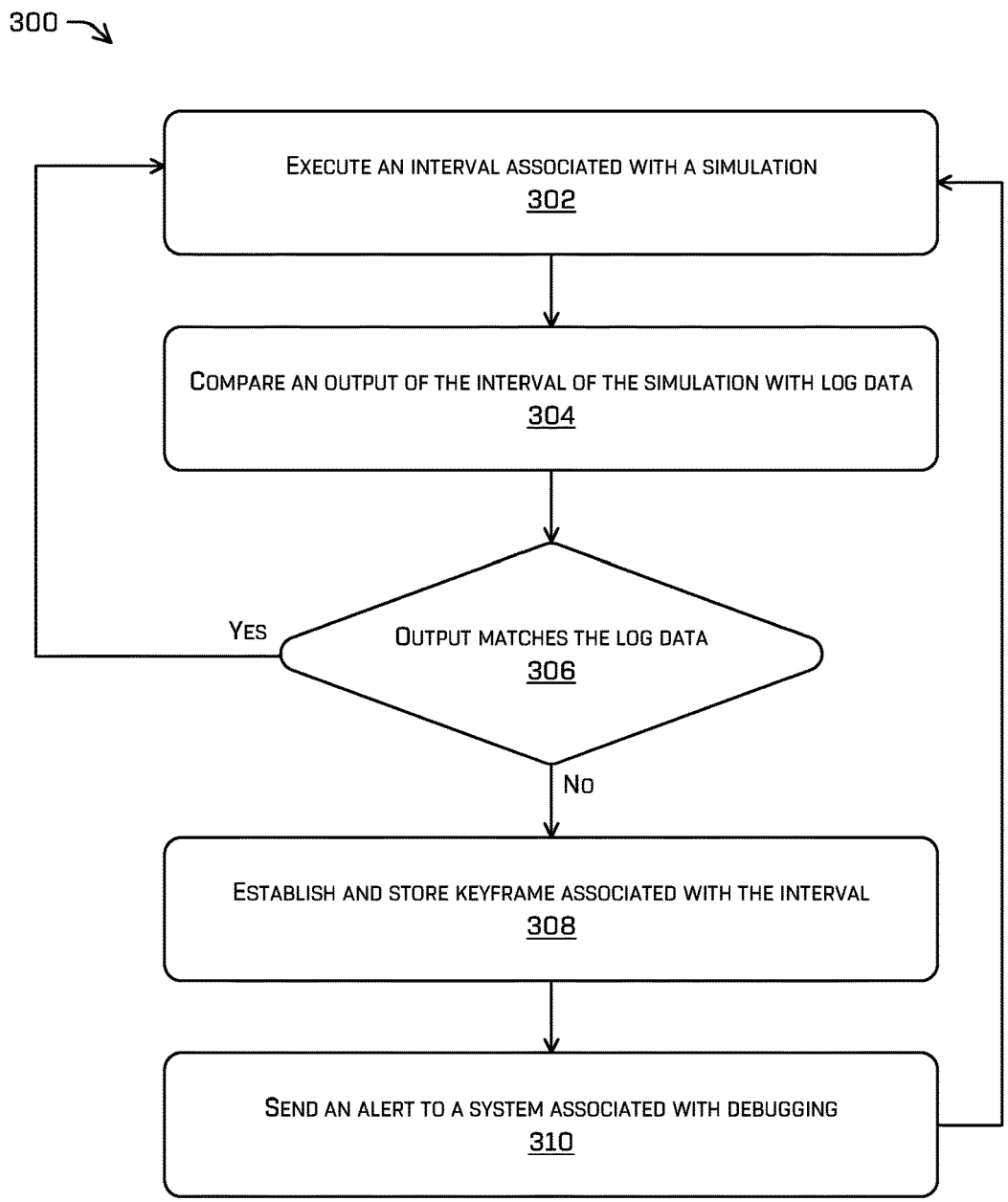
FIG. 3 is a flow diagram illustrating an example process associated with the improved reproducibility of autonomous vehicle systems, in accordance with examples of the disclosure.
Figure 4:
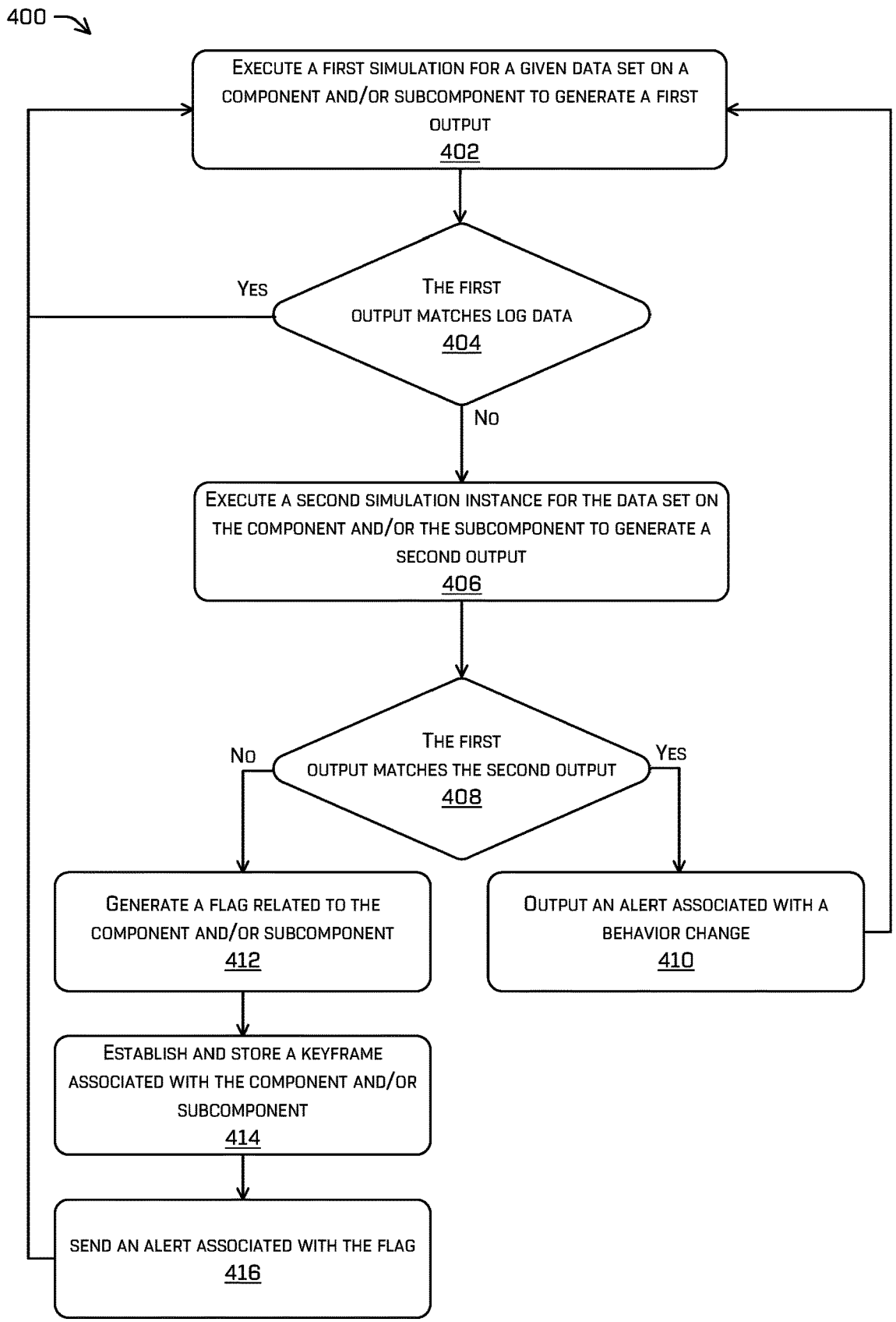
FIG. 4 is another flow diagram illustrating an example process associated with the improved reproducibility of autonomous vehicle systems, in accordance with examples of the disclosure.

FIGS. 3-4 are flow diagrams illustrating example processes associated with the systems discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process 300 associated with the improved reproducibility of autonomous vehicle systems, in accordance with implementations of the disclosure. As discussed above, multiple scenarios with varying conditions and parameters may be executed with respect to simulation and/or test systems associated with an autonomous vehicle and/or by various vehicle systems themselves. To ensure the quality of the simulations and the safety of the autonomous vehicle, the systems discussed herein may be configured to detect non-deterministic results, operations, modules, components, and/or the like for further debugging and testing, such as prior to deployment on the autonomous vehicle.

At 302, a system, such as a simulation system, may execute an interval associated with a simulation. In some cases, the interval may be set by a user, based on a component associated with log data. For instance, the interval may represent a period of time associated with one or more sensor or clock of the vehicle generating the log data. As discussed above, the simulation may represent a single test run associated with a simulation scenario. The simulation scenario may include defined regions, actors or objects, parameters of the actors or objects (e.g., speed, trajectory, initial position, etc.), environmental or physical conditions, and the like usable to test and/or simulate operations of one or more vehicle components and/or subcomponents. In this example, the components and/or subcomponents may be systems and/or components of the vehicle, such as perception systems, prediction systems, planning systems, sensors, drive systems, and the like. The interval may be a period of time associated with the autonomous vehicle and/or a component/subcomponent thereof. For example, the interval may be associated with a frame (such as capture time associated with capturing the frame of a log data) associated with one or more sensor systems (e.g., image capture sensor, lidar sensor, radar sensor, or the like) of the autonomous vehicle.

At 304, the system may compare an output or result of the interval of the simulation with an log data. For example, the log data may be generated by a vehicle operating within a physical environment. In some cases, the log data may include the state or status of one or more components of the vehicle as well as sensor data captured by the vehicle during operations. In this manner, the log data may include both inputs to the component (e.g., the senor data) as well as outputs generated by the component (e.g., decision and operations performed by the vehicle in response to the inputs). As an alternative, the system may compare the output of the interval with a prior simulation based on the same input (e.g., log data and/or scenario).

At 306, the system may determine if the output (e.g. the result data) matches the log data (e.g., the system is operating in a deterministic manner). For example, if the output at the interval of the simulation (e.g., the current state of the system being tested matches within a predefined thresholds or criterions of the expected results), the system may return to 302 and proceed with execution of the next interval, as the system is operating in a deterministic manner. However, if the output does not match the expected results, then the process 300 may advance to 308, as the system is operating in a non-deterministic manner and the simulation system may record data associated with the non-deterministic result for later review.

At 308, the system may also establish and store keyframe associated with the interval and the component and/or controller. For example, the system may store a predetermined number of keyframes associated with a predetermined number of prior intervals to, for instance, assist with debugging. In at least some examples, such keyframes may comprise data regarding the state of the component after performing an operation (e.g., any internal variables, a clock time, a number of and/or values for one or more inputs, a number of and/or values for associated outputs of the components, etc.). As the keyframes are stored, a debugging engineer may utilize the keyframe to reproduce the non-deterministic output without re-running the entire simulation. For instance, a simulation system may initialize the simulation based at least in part on the keyframe data to ensure that the system is in an identical state despite non-determinism that may be exhibited. As such, additional testing may be performed on one or more downstream components that would otherwise be impacted by nondeterministic effects. The debugging engineer may also utilize the keyframes to review the internal state and/or status of the component, upstream component, downstream component, random numbers, clock signals, and the like without re-executing and/or running the entire simulation. In some cases, this may be particularly beneficial as the output is non-deterministic and achieving reproducibly of the output during testing may be difficult.

At 310, the system may send an alert to a system associated with debugging. For instance, the alert may be provided to a debugging system discussed above and/or to a system associated with a software engineer. The alert may provide notification that a potential non-deterministic component and/or subcomponent was detected, a location or accessibility to the keyframes, and/or the like. The process 300 may then return to 302 and continue to execute the next interval of the simulation instance.

FIG. 4 is another flow diagram illustrating an example process 400 associated with the improved reproducibility of autonomous vehicle systems, in accordance with implementations of the disclosure. As discussed above, the simulation system discussed herein may be configured to re-execute a particular simulation scenario over multiple instances and to compare the results of each. In this manner, the simulation system may be configured to determine actual results and to determine if any component and/or subcomponent is operating in an undesirable non-deterministic manner.

At 402, a simulation system may execute a first simulation instance for a given data set on a component and/or sub-component to generate a first output. As discussed above, the simulation instance may represent a single test run associated with a particular data set, such as a simulation scenario. The data set and/or simulation scenario may include defined regions, actors or objects, parameters of the actors or objects (e.g., speed, trajectory, initial position, etc.), environmental or physical conditions, and the like usable to test and/or simulate operations of one or more vehicle components and/or subcomponents.

At 404, the simulation system may determine if the first output matches an log data. For example, the log data may be a predetermined outcome, a result form a prior simulation instance associated with the given data set, or user log data. In some cases, if the component and/or the subcomponent is operating as expected the first output may match the log data within one or more thresholds. In the illustrated example, if the first output matches the log data, the process 400 may return to 402 and execute another simulation instance with, for instance, another data set. However, if the first output does not match the expected results, the process 400 may proceed to 406.

At 406, the simulation system may execute a second simulation instance for the given data set on the component and/or the subcomponent to generate a second output and, at 408, the simulation system may determine if the first output matches the second output. For example, the if the first output matches (within one or more predefined thresholds or criterions) of the second output, the component and/or the subcomponent is operating in a deterministic manner. However, if the first output does not match the second output, then the component and/or the subcomponent is operating in a non-deterministic manner and may benefit from debugging.

If the first output does match the second output, the process 400 may advance to 410 and, at 410, the simulation system may output an alert associated with a behavior change. For example, since the first output didn't match the log data, the component and/or the subcomponent may have been alerted in a manner that caused a change in behavior. The simulation system may output the alert to confirm with a debugging engineer that the change in behavior is expected and that the component and/or subcomponent is operating in an acceptable manner. The process 400 may then return to 402.

If the first output does not match the second output, then the process 400 may advance to 412. At 412, the system may generate a flag related to the component and/or the subcomponent. The flag may indicate that the component and/or subcomponent may be generating outputs that are non-deterministic and/or have other issues. For instance, as the first output does not correspond to the second output, the component and/or the subcomponent may be operating in a non-deterministic manner and/or may have introduced an issue.

At 414, the simulation system may also establish and store one or more keyframes associated with the component and/or subcomponent. For example, the simulation system may store a predetermined number of keyframes associated with individual intervals of each simulation instance to, for instance, assist with debugging. In some cases, the keyframes may be stored in a remote or cloud-based storage system to reduce access time and debugging time for the debugging and/or test engineers.

At 416, the simulation system may send an alert associated with the flag. For instance, the alert may be provided to a debugging system discussed above and/or to a system associated with a software engineer. The alert may provide notification that a potential non-deterministic component and/or subcomponent was detected, a location or accessibility to the keyframes, and/or the like. The process 400 may then return to 402 and continue to execute simulation instances.

Figure 5:
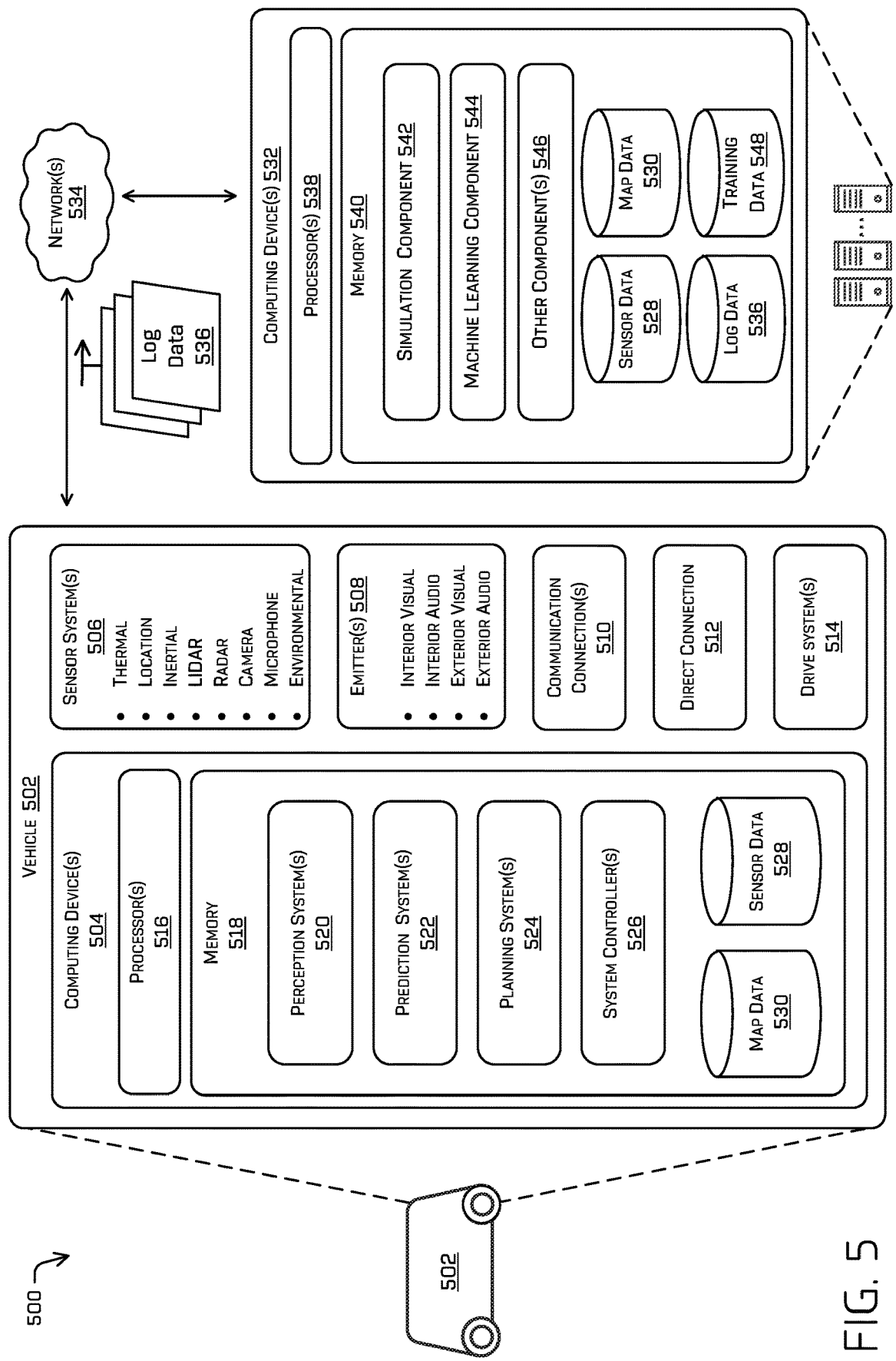
FIG. 5 depicts a block diagram of an example system for implementing the techniques discussed herein.

FIG. 5 depicts a block diagram of an example system 500 for implementing the techniques discussed herein. In at least one example, the system 500 may include a vehicle 502, such the autonomous vehicles discussed above. The vehicle 502 may include computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 may be configured to capture the sensor data 528 associated with a surrounding physical environment.

In at least some examples, the sensor system(s) 506 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 506 may include multiple instances of each type of sensors. For instance, time-of-flight sensors may include individual time-of-flight sensors located at the corners, front, back, sides, and/or top of the vehicle 502. As another example, camera sensors may include multiple cameras disposed at various locations about the exterior and/or interior of the vehicle 502. In some cases, the sensor system(s) 506 may provide input to the computing device(s) 504.

The vehicle 502 may also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also includes exterior emitters. By way of example and not limitation, exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enables communication between the vehicle 502 and one or more other local or remote computing device(s) (e.g., a remote teleoperations computing device) or remote services. For instance, the communication connection(s) 510 can facilitate communication with other local computing device(s) on the vehicle 502 and/or the drive system(s) 514. Also, the communication connection(s) 510 may allow the vehicle 502 to communicate with other nearby computing device(s) (e.g., other nearby vehicles, traffic signals, etc.).

The communications connection(s) 510 may include physical and/or logical interfaces for connecting the computing device(s) 504 to another computing device or one or more external network(s) 534 (e.g., the Internet). For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 510 may comprise the one or more modems as described in detail above.

In at least one example, the vehicle 502 may include one or more drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which may receive and preprocess data from the sensor system(s) 506 and to control operation of the various vehicle systems. In some examples, the drive system controller can include one or more processor(s) and memory communicatively coupled with the one or more processor(s). The memory can store one or more modules to perform various functionalities of the drive system(s) 514. Furthermore, the drive system(s) 514 can also include one or more communication connection(s) that enable communication by the respective drive system with one or more other local or remote computing device(s).

The computing device(s) 504 may include one or more processors 516 and one or more memories 518 communicatively coupled with the processor(s) 516. In the illustrated example, the memory 518 of the computing device(s) 504 stores perception system(s) 522, and prediction system(s) 522, planning system(s) 524, as well as one or more system controller(s) 526. The memory 518 may also store data such as sensor data 528 captured or collected by the one or more sensors systems 506 and map data 530. Though depicted as residing in the memory 518 for illustrative purposes, it is contemplated that the perception system(s) 520, the frame prediction system(s) 522, the planning system(s) 524, as well as one or more system controller(s) 526 may additionally, or alternatively, be accessible to the computing device (s) 504 (e.g., stored in a different component of vehicle 502) and/or be accessible to the vehicle 502 (e.g., stored remotely).

The perception system 520 may be configured to perform object detection, segmentation, and/or categorization on the sensor data 528 and/or the map data 530. In some examples, the perception system 520 may generate processed perception data from the sensor data 528. The perception data may indicate a presence of objects that are in physical proximity to the vehicle 502 and/or a classification or type of the objects (e.g., car, pedestrian, cyclist, building, tree, road surface, curb, sidewalk, unknown, etc.). In some cases, the perception data may in integrated into the map data 530 such as via a semantic layer of a multi-resolution voxel space. In additional and/or alternative examples, the perception and prediction system 520 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc.

The prediction system 522 may also be configured to determine a predicted behavior and/or state corresponding to an identified object. For example, the prediction system 522 may be configured to predict a velocity, position, change in trajectory, or otherwise predict the decisions and movement of the identified objects. For example, the prediction system 522 may include one or more machine learned models that may, based on inputs such as object type or classification and object characteristics, output predicted characteristics of the object at one or more future points in time. In some cases, the predicted behaviors and/or states may be assigned a confidence value, such that the behaviors and/or states may be sorted, ranked, and/or the like.

The planning system 524 may be configured to determine a route for the vehicle 502 to follow to traverse through an environment. For example, the planning system 524 may determine various routes and paths and various levels of detail based at least in part on the identified objects, the predicted behaviors, states and/or characteristics of the object at future times, the confidence value associated with each predicted behavior or state, and a set of safety requirements corresponding to the current scenario (e.g., combination of objects detected and/or environmental conditions). In some instances, the planning system 524 may determine a route to travel from a first location (e.g., a current location) to a second location (e.g., a target location) in order to avoid an object obstructing or blocking a planned path of the vehicle 502. In some case, a route can be a sequence of waypoints for traveling between the two locations (e.g., the first location and the second location). In some cases, waypoints include streets, intersections, global positioning system (GPS) coordinates, etc.

In at least one example, the computing device(s) 504 may store one or more and/or system controllers 526, which may be configured to control steering, propulsion, braking, safety, emitters, communication, and other systems of the vehicle 502. The system controllers 526 may communicate with and/or control corresponding systems of the drive system(s) 514 and/or other components of the vehicle 502, which may be configured to operate in accordance with a route provided from the planning system 524.

In some implementations, the vehicle 502 may connect to computing device(s) 532 via the network(s) 534. For example, the computing device(s) 532 may receive log data 536 from one or more vehicles 502. The log data 536 may include the sensor data 528, perception data, prediction data and/or a combination thereof. In some cases, the log data 536 may include portion of one or more of the sensor data 528, perception data and prediction data.

The computing device 532 may include one or more processors 538 and memory 540 communicatively coupled with the one or more processors 538. In at least one instance, the processor(s) 538 may be similar to the processor(s) 516 and the memory 540 may be similar to the memory 518. In the illustrated example, the memory 540 of the computing device(s) 532 stores the sensor data 528 (including thermal data), the map data 530, the log data 536, and the training data 548. The memory 540 may also store a simulation component 542, a machine learning component 544, as well as other components 546, such as an operating system.

In some cases, the simulation component 542 may be configured to execute simulation instances associated with simulation scenarios to determine if a component or sub-component of the vehicle 502 is operating in a non-deterministic manner. For example, the simulation component 542 may identify non-deterministic behavior by processing multiple iterations of the same simulation scenarios and comparing the results. In these cases, when the results and/or outputs of individual simulation instances associated with the same scenario fail to match, the component and/or subcomponent of the vehicle 402 being tested may be operating in a non-deterministic manner.

The processor(s) 516 of the computing device(s) 504 and the processor(s) 538 of the computing device(s) 532 may be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the computing device(s) 504 and the memory 540 of the computing device(s) 532 are examples of non-transitory computer-readable media. The memory 518 and 540 can store an operating system and one or more software applications, instructions, programs, and/or data to implement the methods described herein and the functions attributed to the various systems. In various implementations, the memory 518 and 540 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 518 and 540 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A system comprising: one or more processors; and one or more non-transitory computer-readable media storing instructions that, when executed by the one or more processors, cause the one or more processors to perform operations comprising: determining an input to a first component of an autonomous vehicle based at least in part on log data generated at least in part by the first component operating in a physical environment; determining first result data output by the first component based at least in part on log data; executing, based at least in part on the input, a first simulation to generate second result data associated with the first component; determining that the first component is exhibiting non-deterministic behavior based at least in part on the first result data and the second result data; logging keyframe data associated with the first component; modifying, as a modified second component, the second component; executing, based at least in part on the keyframe data, a third simulation to generate third result data associated with the modified second component; based at least in part on a difference between the third result data and the second result data, transmitting the modified second component to a vehicle configured to be controlled at least in part by the modified second component.

B. The system of claim A, wherein determining that the first component is exhibiting nondeterministic behavior comprises determining that a difference between the second result data and the first result data meets or exceeds a threshold difference.

C. The system of claim A, the operations further comprising generating reproducibility data, the reproducibility data comprising the keyframe and a state of at least one random number generator associated with the first component.

D. The system of claim A, wherein the modified second component receives, as input, an output from the first component.

E. A method comprising: determining an input to a first component based at least in part on log data having been previously generated at least in part by the first component; determining first result data output by the first component based at least in part on the log data; executing, based at least in part on the input, a first simulation to generate second result data associated with the first component; determining, as a behavior of the first component and based at least in part on the first result data output and second result data, whether the first component is deterministic or nondeterministic; determining, based at least in part on the behavior, a first keyframe associated with the first component; executing, based at least in part on the keyframe, a second simulation; and validating, based at least in part on the second simulation, the second component.

F. The method of paragraph E, wherein determining the first component is exhibiting nondeterministic behavior comprises determining the first result data and the second result data differ by at least a threshold amount.

G. The method of paragraph E, wherein determining the behavior comprises: determining that a change in behavior is expected; and determining, responsive to the change in behavior being expected, that the first component is exhibiting deterministic behavior.

H. The method of paragraph E, wherein validating the second component comprises: determining a difference between an output of the second component generated during the second simulation and log data associated with the second component; determining the difference is less than or equal to a threshold difference; and transmitting the second component to a vehicle configured to be controlled at least in part by the second component.

I. The method of paragraph E, further comprising: modifying, as a modified second component, the second component; executing, based at least in part on the input and the first keyframe, a third simulation to generate fourth result data associated with the modified second component; determining a difference between an output of the modified second component generated during the third simulation and an output of the second component generated during the second simulation associated with the second component; determining the difference is less than or equal to a threshold difference; and transmitting the modified second component to a vehicle configured to be controlled at least in part by the modified second component.

J. The method of paragraph E, further comprising generating reproducibility data, the reproducibility data comprising the first keyframe and a state of at least one random number generator associated with the first component at a time interval associated with the first keyframe.

K. The method of paragraph E, wherein the keyframe comprises at least an internal state of the component.

L. The method of paragraph E, wherein the first component comprises at least one of: a perception system; a planning system; a prediction system; a neural network; or an object tracking system.

M. A non-transitory computer-readable medium storing instructions that, when executed, cause one or more processors to perform operations comprising: determining an input to a first component based at least in part on log data having been previously generated at least in part by the first component; determining first result data output by the first component based at least in part on the log data; executing, based at least in part on the input, a first simulation to generate second result data associated with the first component; determining, as a behavior of the first component and based at least in part on the first result data output and second result data, whether the first component is deterministic or nondeterministic; determining, based at least in part on the behavior, a first keyframe associated with the first component; executing, based at least in part on the keyframe, a second simulation; and validating, based at least in part on the second simulation, the second component.

N. The non-transitory computer-readable medium of paragraph M, wherein determining the first component is exhibiting nondeterministic behavior comprises determining the first result data and the second result data differ by at least a threshold amount.

O. The non-transitory computer-readable medium of paragraph M, wherein determining the behavior comprises: determining that a change in behavior is expected; and determining, responsive to the change in behavior being expected, that the first component is exhibiting deterministic behavior.

P. The non-transitory computer-readable medium of paragraph M, wherein validating the second component comprises: determining a difference between an output of the second component generated during the second simulation and log data associated with the second component; determining the difference is less than or equal to a threshold difference; and transmitting the second component to a vehicle configured to be controlled at least in part by the second component.

Q. The non-transitory computer-readable medium of paragraph M, wherein the operations further comprise: modifying, as a modified second component, the second component; executing, based at least in part on the input and the first keyframe, a third simulation to generate fourth result data associated with the modified second component; determining a difference between an output of the modified second component generated during the third simulation and an output of the second component generated during the second simulation associated with the second component; determining the difference is less than or equal to a threshold difference; and transmitting the modified second component to a vehicle configured to be controlled at least in part by the modified second component.

R. The non-transitory computer-readable medium of paragraph M, wherein the operations further comprise generating reproducibility data, the reproducibility data comprising the first keyframe and a state of at least one random number generator associated with the first component at a time interval associated with the first keyframe.

S. The non-transitory computer-readable medium of paragraph M, wherein the keyframe comprises at least an internal state of the component.

T. The non-transitory computer-readable medium of paragraph M, wherein the first component comprises at least one of: a perception system; a planning system; a prediction system; a neural network; or an object tracking system.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

The invention claimed is:
1. A system comprising:
one or more processors; and
one or more non-transitory computer-readable media storing instructions that, when executed by the one or more processors, cause the one or more processors to perform operations comprising:
determining an input to a first component of an autonomous vehicle based at least in part on log data generated at least in part by the first component operating in a physical environment;

determining first result data output by the first component based at least in part on log data;
executing, based at least in part on the input, a first simulation to generate second result data associated with the first component;
determining that the first component is exhibiting non-deterministic behavior based at least in part on the first result data and the second result data;
wherein the non-deterministic behavior comprises behavior whereby an input to a non-deterministic function results in different outputs when input to the non-deterministic function multiple times;
logging keyframe data associated with the first component;
modifying, as a modified second component, a second component;
executing, based at least in part on the keyframe data, a second simulation to generate third result data associated with the modified second component; and
based at least in part on a difference between the third result data and the second result data, transmitting the modified second component to a vehicle configured to be controlled at least in part by the modified second component.

2. The system as recited in claim 1, wherein determining that the first component is exhibiting non-deterministic behavior comprises determining that a difference between the second result data and the first result data meets or exceeds a threshold difference.

3. The system as recited in claim 1, the operations further comprising generating reproducibility data, the reproducibility data comprising the keyframe data and a state of at least one random number generator associated with the first component.

4. The system as recited in claim 1, wherein the modified second component receives, as input, an output from the first component.

5. A method comprising:
determining an input to a first component based at least in part on log data having been previously generated at least in part by the first component;
determining first result data output by the first component based at least in part on the log data;
executing, based at least in part on the input, a first simulation to generate second result data associated with the first component;
determining, as a behavior of the first component and based at least in part on the first result data output and second result data, whether the first component is deterministic or non-deterministic;
wherein a non-deterministic behavior comprises behavior whereby an input to a non-deterministic function results in different outputs when input to the non-deterministic function multiple times;
determining, based at least in part on the behavior, reproducibility data including at least a first keyframe associated with the first component;
executing, based at least in part on the first keyframe, a second simulation;
validating, based at least in part on the second simulation, a second component; and
sending the reproducibility data to a debugging system.

6. The method as recited in claim 5, wherein determining the first component is exhibiting non-deterministic behavior comprises determining the first result data and the second result data differ by at least a threshold amount.

7. The method as recited in claim 5, wherein determining the behavior comprises:
determining that a change in behavior is expected; and
determining, responsive to the change in behavior being expected, that the first component is exhibiting deterministic behavior.

8. The method as recited in claim 5, wherein validating the second component comprises:
determining a difference between an output of the second component generated during the second simulation and log data associated with the second component;
determining the difference is less than or equal to a threshold difference; and
transmitting the second component to a vehicle configured to be controlled at least in part by the second component.

9. The method as recited in claim 5, further comprising:
modifying, as a modified second component, the second component;
executing, based at least in part on the input and the first keyframe, a third simulation to generate fourth result data associated with the modified second component;
determining a difference between an output of the modified second component generated during the third simulation and an output of the second component generated during the second simulation associated with the second component;
determining the difference is less than or equal to a threshold difference; and
transmitting the modified second component to a vehicle configured to be controlled at least in part by the modified second component.

10. The method as recited in claim 5, further comprising generating reproducibility data, the reproducibility data comprising the first keyframe and a state of at least one random number generator associated with the first component at a time interval associated with the first keyframe.

11. The method as recited in claim 5, wherein the first keyframe comprises at least an internal state of the first component.

12. The method as recited in claim 5, wherein the first component comprises at least one of:
a perception system;
a planning system;
a prediction system;
a neural network; or
an object tracking system.

13. One or more non-transitory computer-readable media storing instructions that, when executed, cause one or more processors to perform operations comprising:
determining an input to a first component based at least in part on log data having been previously generated at least in part by the first component;
determining first result data output by the first component based at least in part on the log data;
executing, based at least in part on the input, a first simulation to generate second result data associated with the first component;
determining, as a behavior of the first component and based at least in part on the first result data output and second result data, whether the first component is deterministic or non-deterministic;
wherein a non-deterministic behavior comprises behavior whereby an input to a non-deterministic function results in different outputs when input to the non-deterministic function multiple times;

determining, based at least in part on the behavior, a first keyframe associated with the first component;

executing, based at least in part on the first keyframe, a second simulation; and validating, based at least in part on the second simulation, a second component.

14. The one or more non-transitory computer-readable media as recited in claim 13, wherein determining the first component is exhibiting non-deterministic behavior comprises determining the first result data and the second result data differ by at least a threshold amount.

15. The one or more non-transitory computer-readable media as recited in claim 13, wherein determining the behavior comprises:

determining that a change in behavior is expected; and determining, responsive to the change in behavior being expected, that the first component is exhibiting deterministic behavior.

16. The one or more non-transitory computer-readable media as recited in claim 13, wherein validating the second component comprises:

determining a difference between an output of the second component generated during the second simulation and log data associated with the second component;

determining the difference is less than or equal to a threshold difference; and transmitting the second component to a vehicle configured to be controlled at least in part by the second component.

17. The one or more non-transitory computer-readable media as recited in claim 13, wherein the operations further comprise:

modifying, as a modified second component, the second component;

executing, based at least in part on the input and the first keyframe, a third simulation to generate fourth result data associated with the modified second component;

determining a difference between an output of the modified second component generated during the third simulation and an output of the second component generated during the second simulation associated with the second component;

determining the difference is less than or equal to a threshold difference; and transmitting the modified second component to a vehicle configured to be controlled at least in part by the modified second component.

18. The one or more non-transitory computer-readable media as recited in claim 13, wherein the operations further comprise generating reproducibility data, the reproducibility data comprising the first keyframe and a state of at least one random number generator associated with the first component at a time interval associated with the first keyframe.

19. The one or more non-transitory computer-readable media as recited in claim 13, wherein the first keyframe comprises at least an internal state of the first component.

20. The one or more non-transitory computer-readable media as recited in claim 13, wherein the first component comprises at least one of:

a perception system;
a planning system;
a prediction system;
a neural network; or
an object tracking system.

* * * * *